United States Patent
Lei et al.

(10) Patent No.: US 9,299,085 B2
(45) Date of Patent: Mar. 29, 2016

(54) SYSTEM AND METHOD FOR ESTIMATING POTENTIAL UNIQUE ONLINE USERS AN ADVERTISEMENT CAN REACH

(75) Inventors: Ming Lei, San Jose, CA (US); Renjie Jiang, Santa Clara, CA (US); Kenneth R. Alton, Mountain View, CA (US); Varun Chirravuri, Medfield, MA (US); Russell W. Quong, Sunnyvale, CA (US); Abhinay Sharma, Los Altos, CA (US); Oren E. Zamir, Los Altos, CA (US); Xing Yu, Santa Clara, CA (US); Zhengzhu Feng, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/246,609

(22) Filed: Sep. 27, 2011

(65) Prior Publication Data
US 2015/0193811 A1    Jul. 9, 2015

(51) Int. Cl.
*G06Q 30/00* (2012.01)
*G06Q 30/02* (2012.01)

(52) U.S. Cl.
CPC ........ *G06Q 30/0242* (2013.01); *G06Q 30/0249* (2013.01); *G06Q 30/0275* (2013.01)

(58) Field of Classification Search
None
See application file for complete search history.

(56) References Cited

U.S. PATENT DOCUMENTS

| | | | |
|---|---|---|---|
| 6,393,479 B1 | 5/2002 | Glommen et al. | |
| 6,714,975 B1 | 3/2004 | Aggarwal et al. | |
| 6,839,680 B1 | 1/2005 | Liu et al. | |
| 6,925,442 B1 | 8/2005 | Shapira et al. | |
| 8,156,216 B1 | 4/2012 | Error | |
| 2003/0163563 A1 | 8/2003 | Bean | |
| 2003/0208594 A1 | 11/2003 | Muret et al. | |
| 2004/0122735 A1* | 6/2004 | Meshkin | 705/14 |
| 2004/0193488 A1* | 9/2004 | Khoo et al. | 705/14 |
| 2004/0243704 A1 | 12/2004 | Botelho et al. | |
| 2007/0005421 A1 | 1/2007 | Labio et al. | |
| 2009/0099904 A1 | 4/2009 | Affeld et al. | |
| 2009/0292803 A1 | 11/2009 | Schneider | |
| 2010/0161438 A1* | 6/2010 | Tomak | 705/26 |
| 2010/0228850 A1 | 9/2010 | Fomitchev | |
| 2011/0004682 A1 | 1/2011 | Honnold et al. | |
| 2011/0276413 A1 | 11/2011 | Lee et al. | |
| 2012/0144016 A1 | 6/2012 | Zhang et al. | |
| 2012/0166379 A1 | 6/2012 | Dasgupta et al. | |

OTHER PUBLICATIONS

U.S. Appl. No. 12/368,834, Jon Feldman et al., Not Published.
US Office Action in U.S. Appl. No. 13/246,547 DTD Dec. 20, 2013.
US Office Action in U.S. Appl. No. 13/246,547 DTD Jun. 5, 2013.
US Office Action in U.S. Appl. No. 13/246,641 DTD Jan. 31, 2014.

* cited by examiner

*Primary Examiner* — Thomas M Hammond, III
*Assistant Examiner* — Katherine Kolosowski-Gager
(74) *Attorney, Agent, or Firm* — Foley & Lardner LLP; John D. Lanza

(57) ABSTRACT

Methods, systems, and computer programs encoded on a computer storage medium include receiving, from an advertiser, advertisement criteria associated with an advertisement, the advertisement criteria comprising a first set of criteria and a budget and/or a bid, the advertisement criteria to be used in advertisement auctions for which the advertisement is to be considered for display to users performing online actions; determining a number of users for whom the advertisement was a candidate to be shown based on the first set of criteria associated with the advertisement, but to whom the advertisement was not shown based on the budget and/or bid of the advertisement during a particular period of time; and providing, in a report, information relating to the number of users.

14 Claims, 8 Drawing Sheets

US 9,299,085 B2

SYSTEM AND METHOD FOR ESTIMATING POTENTIAL UNIQUE ONLINE USERS AN ADVERTISEMENT CAN REACH

BACKGROUND

The Internet provides access to a wide variety of content. For instance, images, audio, video, and web pages for many different topics are accessible through the Internet. The accessible content provides an opportunity to present advertisements to users. Advertisements can be placed within content, such as a web page, image or video, or the content can trigger the display of one or more advertisements, such as presenting an advertisement in an advertisement slot within the content and/or in an advertisement slot of a pop-up window or other overlay.

Advertisers can decide to target their ads within particular types of content (e.g., web sites of a particular genre) using various advertising management, or analytics, tools. These tools also allow an advertiser to track the performance of various advertisements (ads or ad groups) or advertising campaigns (ad campaigns). The ad criteria parameters used to determine when to display a particular ad can also be changed using advertising management tools.

The data that is used to generate the performance measures of ads for the advertiser generally includes all data that is available. This data usually includes a combination of data from multiple servers. The combined data is large enough that performance measures generated from the data are needed to provide an efficient way of understanding the data. The data, therefore, must be processed. Processing of the data to generate useful and accurate performance measures involves a number of obstacles. For instance, if a performance measure is based upon a user's actions over a period of time, a cookie can be used to track a user's actions over a period of time. If this cookie is removed during the period of time, the data will not contain an accurate account of the user's actions during a period of time.

Also, when an advertiser provides a bid and a budget for an advertisement in an Ad Group or an Ad Campaign that the advertiser wants seen on the Internet by way of a publisher's web sites, it would be desirable to provide the advertiser with information to allow the advertiser to readily determine if the bid and budget associated with the advertisement were appropriate to reach the number of users that the advertiser would like to reach.

SUMMARY

In general, one innovative aspect of the subject matter described in this specification can be embodied in methods that include receiving, from an advertiser, advertisement criteria associated with an advertisement, the advertisement criteria comprising a first set of criteria and a budget and/or a bid, the advertisement criteria to be used in advertisement auctions for which the advertisement is to be considered for display to users performing online actions; determining a number of users for whom the advertisement was a candidate to be shown based on the first set of criteria associated with the advertisement, but to whom the advertisement was not shown based on the budget and/or bid of the advertisement during a particular period of time; and providing, in a report, information relating to the number of users.

Various embodiments of a report generating system include a receiving unit configured to receive, from an advertiser, advertisement criteria associated with an advertisement, the advertisement criteria comprising a first set of criteria and a budget and/or a bid, the advertisement criteria to be used in advertisement auctions for which the advertisement is to be considered for display to users performing online actions; a determining unit configured to determine a first number of users for whom the advertisement was a candidate to be shown based on the first set of criteria associated with the advertisement, but to whom the advertisement was not shown based on the budget and/or bid of the advertisement during a particular period of time; and a providing unit configured to provide, in a report, information relating to the first number of users.

Various embodiments of a non-transitory computer readable medium storing computer program product, which, when executed by at least one computer, causes the at least one computer to perform the functions of:

receiving, from an advertiser, advertisement criteria associated with an advertisement, the advertisement criteria comprising a first set of criteria and a budget and/or a bid, the advertisement criteria to be used in advertisement auctions for which the advertisement is to be considered for display to users performing online actions;

determining a number of users for whom the advertisement was a candidate to be shown based on the first set of criteria associated with the advertisement, but to whom the advertisement was not shown based on the budget and/or bid of the advertisement during a particular period of time; and providing, in a report, information relating to the number of users.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
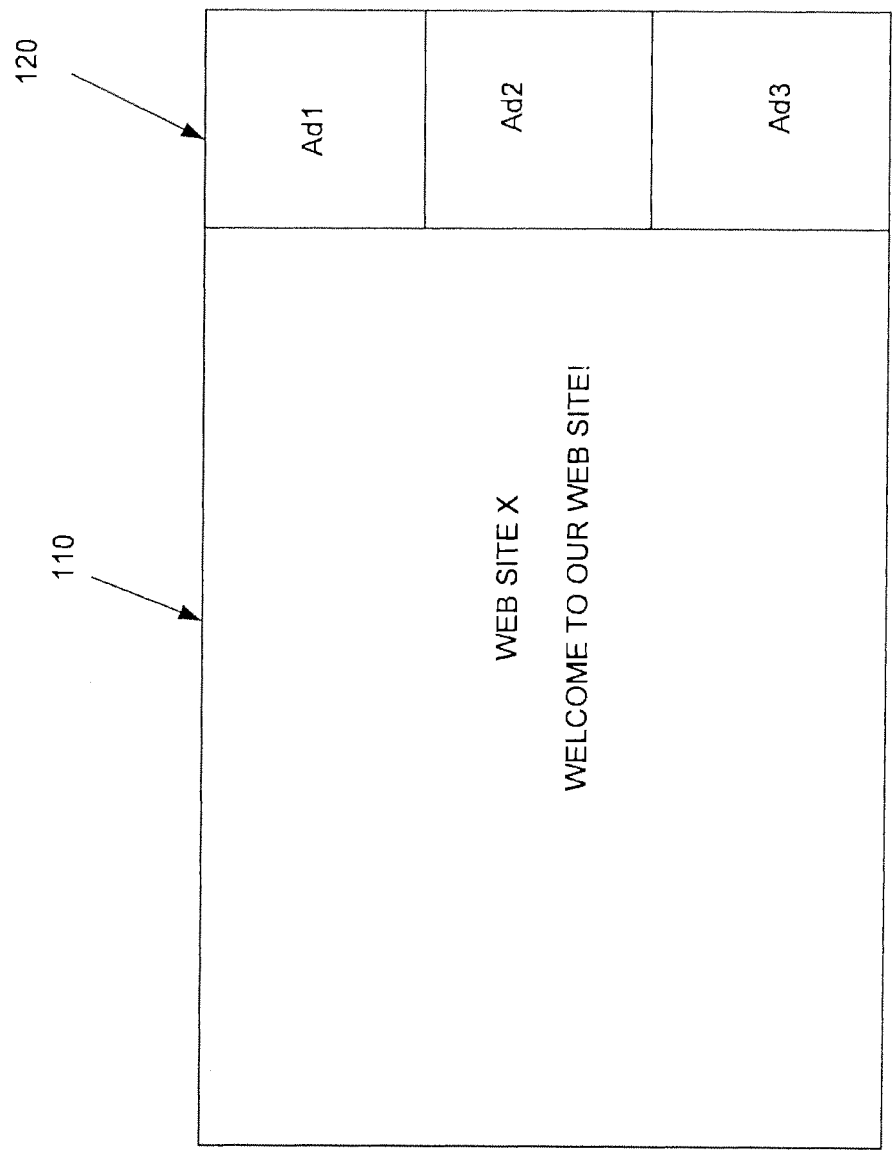
FIG. 1 is a diagram showing advertisements provided on a portion of a web page for display to a user, in accordance with an illustrative embodiment.

In one embodiment, a report is generated that provides a user, such as an advertiser, with information as to potential users that could be shown an ad regardless of bid and/or budget. In other embodiments, the report includes information as to users who were not shown the ad due to quality reasons and/or frequency capped reasons. The report can also distinguish between users and unique users by using a cookie correction feature.

A unique identifier can be stored as a cookie. Cookies can be deleted from user devices, such as by a user deleting cookies, a browser deleting cookies, (e.g., upon browser exit, based on a browser preference setting), or some other software (e.g., anti-spyware) deleting cookies.

If cookies are deleted from a user device, a new cookie will be set on the user's device when the user visits a web page. The new cookie may be used to store a new quasi-unique identifier, and thus subsequent user interaction data that occurs on the user device may be associated with a different identifier. Therefore, because each user identifier is considered to represent a different user, the user interaction data associated with the deleted cookies are identified as being associated with a different user than the user interaction data that is associated with the new cookies.

Described herein are illustrative embodiments for providing an advertiser with pertinent information, in the form of a report, for use in setting an appropriate budget and bid for advertisements in an ad group and/or an ad campaign. An ad group contains one or more ads which target a set of keywords, placements, or both. The advertiser sets a bid, or price, to be used when an ad is triggered by the keywords or placements in the ad group. An ad campaign is a set of one or more ad groups of an advertiser, with each ad group serving a different purpose. For example, a first ad group in an ad campaign may correspond to ads that introduce a particular product to users, a second ad group in the ad campaign may correspond to ads that provide more details on the particular product (e.g., to be output at a later point in time after the first ad group has been shown to users), and a third ad group in the ad campaign may correspond to other, related products of the same advertiser. According to various embodiments, an advertiser Is provided with information about how many unique users have been reached by an advertisement of the advertiser, as well as how many potential users were not reached due to inadequate budget and/or low bid when the advertisement was submitted to advertisement placement software such as Google AdWords™. By providing the advertiser with detailed statistics on the number of unique users an advertisement or group of advertisements has reached and the number of unique users the advertisement or group of advertisements has lost or otherwise not reached due to various reasons during a time period, the advertiser can make an informed decision as to future budgets and/or bids to place for an advertisement.

For a particular period of time, e.g., a day, a week, a month, the following sets of users may be categorized by a server computer in various embodiments:

Potential Users: Set of unique users for whom the ad can potentially be shown to during the particular period of time. The potential users include the following subsets of users: shown users, budget lost users, bid lost users, quality lost users, and frequency capped users. In determining potential users, in the first embodiments, potential users are the ones for which an advertisement is returned from an ad index (which stores ads) to an ad server (which serves ads to web pages). In other words, when ad advertisement is to be considered for an auction caused by a user action, that ad is provided from a ad index to the ad server. When that ad loses out to other ads for showing to a user (e.g., together with search results of an online search requested by the user), that ad is returned back to the ad index from the ad server. A ad index corresponds to a database that stores candidate advertisements, and a ad server corresponds to a processor that determines which candidate advertisements provided by different ad indexes are to be shown to a user who has accessed a particular web page or who has initiated a particular keyword or image search to be conducted on the Internet. The ad server looks at data such as closeness of search phrases input by a user as compared to search phrases provided by the advertiser when seeking to have his/her advertisement displayed to users, the particular bid provided by the advertiser for having his/her advertisements displayed to a user, the genre of a particular web site entered by the user, the relevance as compared to genres of web sites selected for inclusion of an advertisement by an advertiser, and/or other factors, etc.

Shown Users: Set of unique users who have been shown the advertisement at least one during a particular period of time (e.g., the last 24 hours).

Budget Lost Users: Set of unique users who were not shown the advertisement, but who can potentially be shown the advertisement by the advertiser raising his/her budget during the particular period of time. The budget is a criteria for which an advertiser places a value when entering an advertisement or a group of advertisements in an advertisement placement application such as Google AdWords™ or Google Adsense™, for possible inclusion on a user's displayed web page (e.g., together with search results provided to the user based on an Internet keyword search requested by a user that caused the auction to be performed). For example, the advertiser may enter a budget of X dollars for a particular advertisement. The ad server selects the advertisement based on various criteria and debits the advertiser's account for this advertisement for each impression, click, conversion, mouse over, or other interaction. When the budget has been depleted by the debits, the advertisement is no longer shown. The server may then be configured to determine further users who would have received the advertisement based on the various criteria considered by the ad server but did not because the budget was depleted. These users may be identified as Budget Lost Users.

Bid Lost Users: Set of unique users who were not shown the advertisement, but who can potentially be shown the advertisement by the advertiser raising his/her bid during the particular period of time. The bid is a criteria for which an advertiser places a value when entering an advertisement or a group of advertisements in an advertisement placement application such as Google AdWords™ or Google Adsense™, for possible inclusion on a user's displayed web page (e.g., together with search results provided to the user based on an Internet keyword search requested by the user). If the bid is below other advertiser's bids for a particular word, string or search term or criteria, then those other advertisers will have their advertisements included on the user's displayed web page. The bid typically corresponds to a price (e.g., 10 cents) that the advertiser is willing to pay when a user clicks on his/her advertisement, when the system sends an impression of the advertisement to a user, or when another criteria is met with respect to the advertisement.

Quality Lost Users: Set of unique users who were not shown the advertisement due to quality reasons, such as low predicted Click Thru Rate (pCTR), or low relevancy, during the predetermined time period. For example, if a user's keyword search phrase is not as close to the advertiser's search phrases assigned to the advertisement as another advertiser's search phrases, then the other advertiser's advertisement has a better likelihood of being displayed to the user along with the user's search results. The system may be configured to run a pCTR algorithm which is configured to determine or predict a CTR for a particular advertisement based on properties of the ad, properties of the web page/web site that the ad is placed on, as well as information of the user.

Frequency Capped (FreqCapped) Users: Set of unique users who have been shown the advertisement at least one during the predetermined period of time, but who were not shown the advertisement additional times due to frequency capping reasons.

The category of Shown Users is disjoint from the union of Budget Lost Users, Bid Lost Users, and Quality Lost Users, since users who have been shown the advertisement at least once are excluded from those sets of users. Also, the category of Potential Users is a super set of all of the other sets of users. Further, FreqCapped Users is a subset of Shown Users, since all Frequency Capped users have been shown the advertisement at least once. Still further, there is an overlap between any two of Budget Lost Users, Bid Lost Users, and Quality Lost Users, since an advertisement can be lost to the same user for different reasons in different auctions made during the particular period of time. Thus, the same user can be in more than one of those sets of users.

By providing a size (e.g., a numerical value corresponding to a number of unique users) for each of the above sets of users to an advertiser for a particular time period, the advertiser can optimize his/her bid and budget to meet his/her particular needs.

To generate the above sets of users, the system may be configured to create a Statistics table (Stats table) stored in memory, designated as DailyAdGroupCriteriaUserShareStats in an illustrative embodiment, which has the following columns to store adgroup-criteria statistics data.

DailyAdGroupCriteriaUserShareStats
    Date: DATE (e.g., mmddyy)
    AdGroupID: BIGINT (e.g., INT64)
    CriteriaID: BIGINT
    AdNetworkTypeID: INT (e.g., INT32)
    LocalPotentialUsers: BIGINT
    LocalShowUsers: BIGINT
    LocalBidLostUsers: BIGINT
    LocalBudgetLostUsers: BIGINT
    LocalQualityLostUsers: BIGINT
    LocalFreqCapUsers: BIGINT In the Stats table, the Date column stores the date when the statistics were obtained. The AdGroupID column stores AdGroup identification data relating to a particular AdGroup for which user share statistics are being generated. The CriteriaID column stores data corresponding to a unique ID of a criteria associated with the AdGroup. The criteria can be a particular keyword phrase associated with the advertisements in the AdGroup or a certain website or websites for which the advertisements in the AdGroup are desired to be displayed to a user visiting the website(s).

The LocalPotentialUsers column stores data corresponding to the number of unique users of all of the auctions of the adgroup/criteria (that is, the particular criteria in the criteria column associated with the particular adgroup in the adgroup column of the stats table). The LocalBidLostUsers column stores data corresponding to the number of unique users who were not shown an advertisement of the adgroup/criteria (that is, the particular criteria in the criteria column associated with the particular adgroup in the adgroup column of the stats table) due to insufficient bid made by the advertiser (e.g., a too low bid entered by the advertiser in the Google AdWords™ application for an ad group).

The LocalBudgetLostUsers column stores data corresponding to the number of unique users who were not shown an advertisement of the adgroup/criteria (that is, the particular criteria in the criteria column associated with the particular adgroup in the adgroup column of the stats table) due to insufficient budget made by the advertiser (e.g., a too low advertising budget entered by the advertiser in the Google AdWords application for an adgroup).

The LocalQualityLostUsers column stores data corresponding to the number of unique users who were not shown an advertisement of the adgroup/criteria (that is, the particular criteria in the criteria column associated with the particular adgroup in the adgroup column of the stats table) due to quality reasons (e.g., a too low pCTR or too low relevancy of a keyword phrase associated with an advertisement of an adgroup as compared to a keyword phrase entered by a user performing an Internet keyword search).

The LocalFreqCapUsers column stores data corresponding to the number of unique users who were shown an advertisement of the adgroup/criteria (that is, the particular criteria in the criteria column associated with the particular adgroup in the adgroup column of the stats table) at least once but not more than a predetermined number of times due to frequency capping reasons (e.g., an advertisement display rule in which a particular advertisement can be shown to a unique user no more than M times in a 24 hour period, M being an integer greater than one).

In various embodiments, the DailyAdGroupCriteriaUserShareStats table is populated at the end of each day, and preferably as a batch process that can be performed during the early morning hours (e.g., between 1 a.m. and 4 a.m.) when Internet traffic is low. For each query made by an online user during the date associated with the DATE column, the user information is retrieved, and stored in a temporary log file, referred to herein as tmp-AdQueryState log file. The user information that is retrieved can be a cookie associated with the user or the browser used by the user, for example (e.g., biscotti_uid or some other type of user id). From the tmp-AdQueryState log file, user information is joined with adgroups shown or lost in a query, and the information is aggregated to obtain the statistics to be displayed as a User Share Report. That is, information is joined at the aggregate level, so that privacy concerns of individual users are preserved in that unique user information is not provided in the User Share Report to an advertiser. The User Share Report can be displayed to an advertiser via the application that the advertiser uses to show his/her advertisements to Internet users, such as a Google Adwords application or a Google Adsense application.

FIG. 1 shows a web page that includes a region for displaying ads to a user visiting that web page. In particular, the web page has an ad region 120 that includes space for three separate ads (Ad1, Ad2, Ad3) that has won an auction caused by a user visiting the web page. The web page also includes a non-ad portion 110, which in this case is a "Welcome Greeting" to a user visiting this web site.

Figure 2:
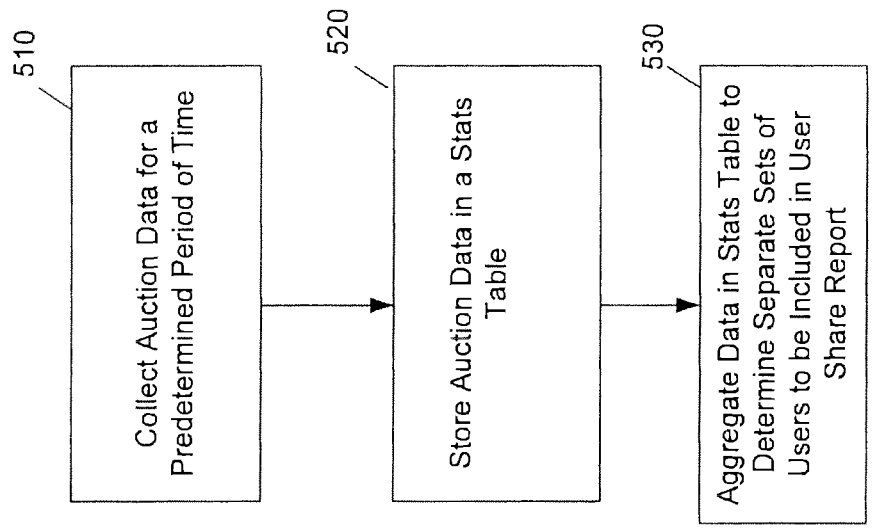
FIG. 2 is a flow diagram showing the steps used in filling a stats table based on Internet auctions performed within a predetermined time period, consistent with various embodiments of the invention.

Referring now to FIG. 2, in stage 510, auction data for a predetermined period of time (e.g., the previous 24 hour time period) is collected by a ad server (see ad server 610 in FIG. 3, for example), or by a processor connected to a ad server and configured to collect auction data for a particular period of time. In stage 520, the auction data is stored, as a batch process, in the DailyAdGroupCriteriaUserShareStats table. In stage 530, the data stored in the DailyAdGroupCriteriaUserShareStats table is aggregated to determine the separate sets of users (e.g., Potential Users, Bid Lost Users, etc.), to be provided to an advertiser in a User Share Report.

As explained earlier, a ad server is an advertisement processing component that associates candidate advertisements provided by advertisers for possible inclusion on websites visited by online users, with particular information provided by those users, such as keyword search phrases or metadata of web sites that the users are visiting. Based on various criteria, such as the closeness of the user-entered keyword search phrase and the keyword phrases entered by the advertiser for an Adgroup in an advertisement application, based on a particular bid placed by the advertiser for displaying the advertisement (e.g., a price that the advertiser is willing to pay if the advertisement is shown to or clicked by a user), and based on other criteria, such as predicted click thru rate of an advertisement, or pCTR, and/or other factors, the ad server determines from various ad indexes that provide candidate advertisements to the ad server which of those candidate advertisements are the "best" advertisements for display to a user when the user is either provided with his/her Internet search results or when the user enters into a particular web page that allows advertisements to be displayed thereon. This determination by the ad server is done for each auction, or event, caused by an online user, and is done prior to providing the particular requested content to the user. In some embodiments, the recording of this information in the tmp-AdQueryState log file is done as a separate off-line pipeline process, at the same time the ad server is determining which candidate advertisements to display to a user via the user's browser. The determination by the ad server of which ads win ad auctions Is based in part on advertisement criteria comprising a first set of criteria and a budget and/or a bid set by an advertiser for the advertisement. The first set of criteria may include relevancy of an ad to a particular web site currently being visited by a user, the pCTR of an ad, etc.

Figure 3:
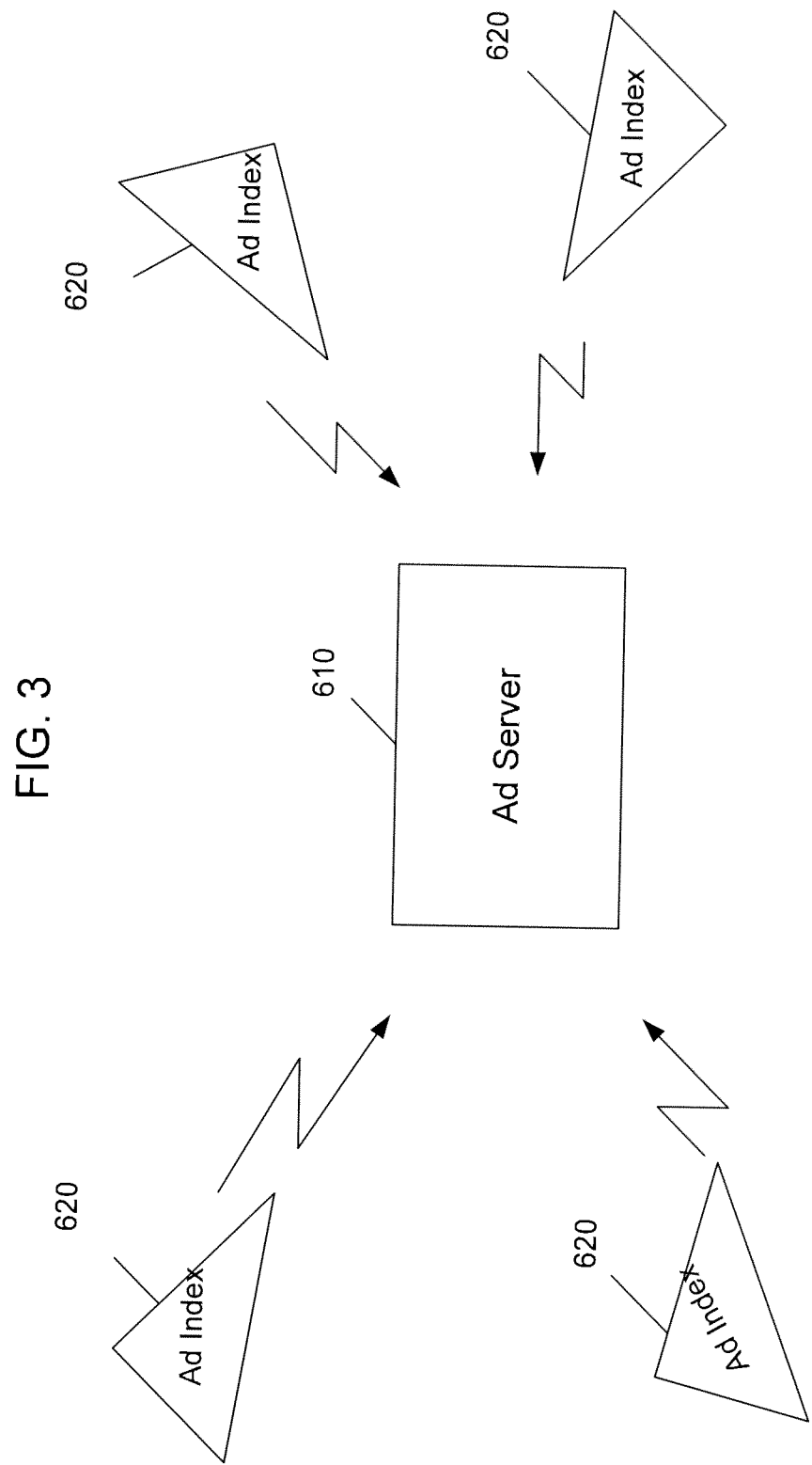
FIG. 3 is a block diagram of elements used in determining which candidate advertisements are to be included in an Internet auction, consistent with various embodiments of the invention.

FIG. 3 shows a ad server 610 that receives candidate advertisements from advertisements ad indexes 620, in which the ad server 610 determines, based on an auction (e.g., the keyword phrase used in the auction) which of the candidate advertisements are to appear, or be impressed, onto a web page of a user that created the auction. For each auction caused by an online user action, the ad server 610 obtains relevant ads from the advertisement ad indexes 620, and determines which ones are to be shown to the user on a web page as ads that have won that auction. The advertiser's bid, the ads' pCTR, the relevancy of search phrases assigned to the ads, are all things used by the ad server 610 in determining which ads win and which ads lose an auction, in which the losing ads are returned from the ad server 610 back to the advertisement ad index 620 in which it was stored.

According to various embodiments, for each eligible query that results in an auction being performed, the following information is written into the tmp-AdQueryState log file by way of a QueryStateEventMessage:
- If a cookie exists for a user (e.g., biscotti_uid), the cookie is logged into the log file.
- If a cookie does not exist for a user, if the query is a request made by a mobile device, then a pseudonymous ID of the mobile device is logged into the log file. The pseudonymous ID of the mobile device is used for privacy reasons, so as to protect the privacy of the user who created the query.
- Alternatively, a client's IP address can be used, but that is not as reliable as using the user's cookie (since more than one unique user can have the same IP address, as provided by way of an Internet browser).

Based on statistical information (e.g., Russell's estimation), the coverage of user's cookie and pseudonymous ID of the mobile device is around 85%. Extrapolation of that data to 100% of users can be done by multiplication.

Figure 4:
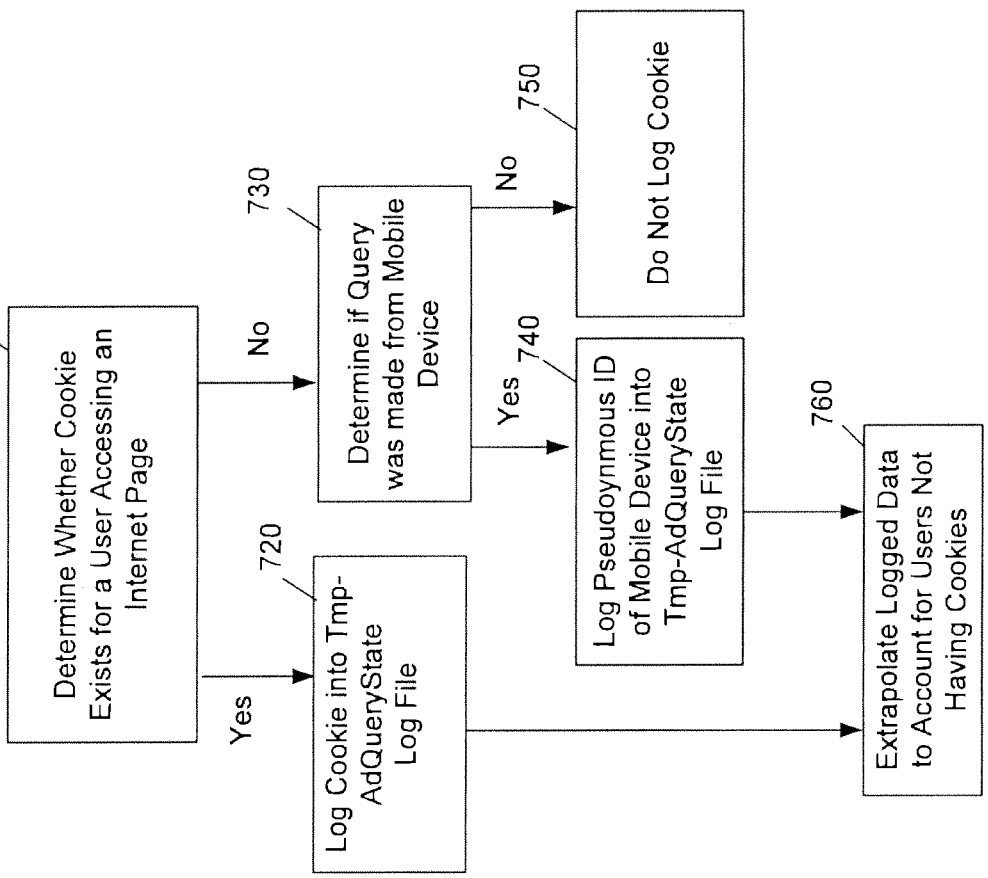
FIG. 4 is a flow diagram showing steps involved in determining whether a query has an associated cookie, and thus to have its associated auction information logged into a log file, consistent with various embodiments of the invention.

FIG. 4 shows the steps involved in the above method. In a step 710, a determination is made as to whether a cookie exists for a user accessing an Internet page. If the cookie exists, in a step 720, the cookie is logged into the tmp-AdQueryState log file. If the cookie does not exist, in a step 730, a determination is made if the query was made from a mobile device. If Yes, then the pseudonymous ID of the mobile device is logged into the tmp-AdQueryState log file in step 740. If No, then the cookie is not logged in step 750. In step 760, the logged data is extrapolated upwards to account for users not having cookies.

In an illustrative embodiment, the tmp-AdQueryState log file has the following structure:
ad_group_id: INT64
criteria_id: INT64
reject_class: INT32 (although lost impressions are grouped into bid lost, budget lost and quality lost sets, the reject reason is written in this field for diagnosis purposes).
content_bid_lost_impression_set: this is a value set for bid lost impressions.
content_budget_lost_impression_set: This is a value set for budget lost impressions.
content_quality_lost_impression_set: This is a value set for quality lost impressions.
content_freq_cap_impression_set: This is a value set for frequency capped impressions.

From the above information stored in the tmp-AdQueryState log file on a daily basis or on a weekly basis, for example, a User Share Report can be generated for an advertiser, so that the advertiser can set his/her bid and/or budget for future ad groups or ad campaigns optimally.

The User Share Report may be computed on the same day that other data processing, such as map reduce (MR) processing, is performed on online data. For each day, the User Share Report can be populated by using primary key/secondary key structure in a map reduce (MR) hierarchical database of user Internet data, according to several embodiments.

In more detail, a two-stage MR approach is utilized to measure User Share Data in some embodiments. A first MR stage is utilized to obtain user reach status for each <ad_group_id, criteria_id, user_id> tuple.

A Mapper reads log files and outputs data as follows:
primary key: <ad_group_id, criteria_id, user_id>
secondary key: null The Mapper outputs the following value: <shown_impr, bid_lost_impr, budget_lost_impr, quality_lost_impr, freq_capped_impr>, in which each element in <shown_impr, bid_lost_impr, budget_lost_impr, quality_lost_impr, freq_capped_impr> is numeric (>=0), and represents how many times the <ad_group_id, criteria_id, user_id> is observed in a user share group from a particular event (e.g., ad auction) in the log files.

By way of example, for ad_group_id: x, criteira_id: y, user_id: z, if there is one shown impression from an auction, the output of the Mapper becomes:
key: <x, y, z>
value: <1, 0, 0, 0, 0> (shown_impr=1)
If there is one bid lost in the auction, the value output by the Mapper is <0, 1, 0, 0, 0>

The MR approach uses a Mapper as described above, and it also uses a Reducer. The Reducer shares the primary key with the Mapper, as follows: reducer output value: <shown, bid_lost, budget_lost, quality_lost, freq_capped> The number of potential impressions on <ad_group_id, criteria_id, user_id> is determined, in which the elements are Boolean (true or false). The operation of the Reducer is described in more detail below The following pseudo-code may be executed by the Reducer in accordance with some embodiments:

```
if shown is true, the user has been shown the ad at least once;
        if bid-lost/budget-lost/quality-lost is true, there is at least
one impression in that group and the user has not been shown the ad
because of that;
        if freq_capped is true, the user has been frequency capped
and is not shown the ad at least one because of that.
            Assuming <shown_impr, bid_lost_impr, budget_lost_impr,
quality_lost_impr, freq_capped_impr> is the aggregation of all input
values on a particular <ad_group_id, criteria_id, user_id>, the
following pseudo code explains how the MR approach operates to obtain
user share report data, in accordance with some embodiments:
if (shown_impr > 0) {
   shown = true
} else {
   if (bid_lost_impr) > 0
      bid_lost = true
   if (budget_lost > 0)
      budget_lost = true
   if (quality_lost > 0)
      quality_lost = true
}
if (freq_capped_impr > 0)
   freq_capped = true
```

A first example of how the MR may operate in accordance with some embodiments for creating user share data is provided below.

Example #1 ad_group_id: x, criteira_id: y, user_id: z, and there are 3 inputs from the Mapper:
<1, 0, 0, 0, 0>, <0, 1, 0, 0, 0> and <0, 0, 1, 1, 1>
the Reducer output becomes:
key: <x, y, z>
value: <true, false, false, false, true>
In this example, the user has been shown the ad once, and so bid-lost/budget-lost/quality-lost are set equal to zero.

A second example of how the MR may operate in accordance with some embodiments for creating user share data is provided below.

Example #2 ad_group_id: x, criteira_id: y, user_id: z, and there are 2 inputs from the Mapper
<0, 2, 0, 0, 0> and <0, 0, 1, 1, 0>
the Reducer output becomes:
key: <x, y, z>
value: <false, true, true, true, false>

A second MR stage is described below, for obtaining user share data in accordance with some embodiments. The second MR stage converts statistics on <ad_group_id, criteria_id, user_id> to unique user statistics of <ad_group_id, criteria_id>. In the second MR stage, the Mapper removes user_id from <ad_group_id, criteria_id, user_id>, which allows the Reducer to aggregate on <ad_group_id, criteria_id>. The Reducer aggregates across users, and unique user share data, as follows, in accordance with some embodiments:
key: <ad_group_id, criteria_id>
value: <shown_users, bid_lost_users, budget_lost_users, quality_lost_users, freq_capped_users>

An example of pseudo code used in second MR stage processing is explained below, with reference to an example.

Example 3 inputs to Mapper (in format key: value), value=<shown, bid_lost, budget_lost, quality_lost, freq_capped>
<x, y, z1>: <false, true, true, false, false> (ad z1 has been lost due to bid and budget)
<x, y, z2>: <false, true, false, false, false> (ad z2 has been lost due to bid)
<x, y, z3>: <true, false, false, false, false> (ad z3 has been shown to the user)
The Mapper has 3 outputs:
<x, y>: <false, true, true, false, false>
<x, y>: <false, true, false, false, false>
<x, y>: <true, false, false, false, false>
The Reducer receives the Mapper output, and outputs the tuple <shown_users, bid_lost_users, budget_lost_users, quality_lost_users, freq_capped_users>, in which these elements are numeric.
Based on the above example, the Reducer output is <x, y>: <1, 2, 1, 0, 0>
This means that for <x, y>, there is one shown user (ad z3), two bid-lost users (ads z1, z2), and one budget lost user(ad z1). Accordingly, a user share report can be generated based the output of the Reducer.

As described above, one aspect of providing the advertiser with pertinent information in the User Share Report is that unique users are discerned, and counted with respect to advertisements shown and advertisements that were not shown but could have been shown if a bid and/or budget was increased (or if quality reasons were changed). Cookie correction is performed for online accesses that generate auctions, whereby cookie correction filters non-unique users from unique users accessing the Internet. As explained earlier, there are many different reasons why it is difficult to count unique users, such as users performing cookie reset during an online (e.g., Internet) session, users deleting cookies, cookies expiring, users disabling their cookies, and the Internet browser used by users hiding cookies and/or providing its own "default" cookie in its place. When a user requests a cookie via a browser as part of an HTTP request to a server, the server creates a new cookie with an initialization time (or time stamp) associated with that new cookie included in information providing in the new cookie (e.g., part of the cookie header), and all subsequent cookies include that initialization time as part of the cookie information. However, the browser may not hold onto cookies after a certain period of time, and thus this may cause the user to have to make subsequent requests for cookies.

To account for these cookie issues, the cookie correction algorithm only selects "good" cookies, which are cookies that have persisted for a period of time on the Internet (e.g., 12 hours or more). In more detail, the persistence of a cookie indicates that a browser can hold the cookie for a sufficient amount of time, and does not erase or delete cookies from a user, which will result in the user making another request to the server for a cookie and the server sending a new cookie to the user via the browser, and thus making it difficult to determine unique users based on received cookies. Thus, if a browser deletes cookies for some reason after a certain amount of time, thereby requiring a user to make a new request for a cookie to the server and the server sending the new cookie to the user via the browser to use for subsequent requests, this is indicative of a "bad browser" with respect to counting unique users based on received cookies from that browser, since the browser may output different cookies associated with the same user accessing the same web page over a period of time. As such, if a cookie is reused for at least a certain number of Internet accesses (e.g., two or more) after an initialization time corresponding to when the cookie was first created, each of the reused cookies is determined to be "seasoned" and thus counted for purposes of determining unique users accessing a web page. Put in another way, "seasoning" of a cookie is determined with respect to the initialization time of the cookie, in that all cookies with the same ID are received at a particular time that is checked against the initialization time of the cookie to determine if the cookie is "seasoned." The "goodness" of a cookie is determined on a request-by-request basis, in which the time stamp of a cookie included in each request is checked against the time that the cookie was received by a server as part of a request to access a particular web site.

The following software pseudo code can be performed in cookie correction in an illustrative embodiment:

```
For an Adgroup ad1
    Goodusers_ad1 = {shown_impression_ad1,
lost_impression_ad1, . . .}
    Ad1_uniqueusers = (AuctionParticipation_ad1 /
AuctionParticipation_ad1, goodusers) * goodusers_ad1
```

The term AuctionParticipation corresponds to all auctions for which advertisements of Adgroup Ad1 participated in. Goodusers_ad1 is a vector of values (including shown impressions, bid lost, budget lost, frequency capped, etc.) for adgroup Ad1 computed using only page views from users having "seasoned" (also referred to herein as "good") cookies. AuctionParticipation_ad1, goodusers corresponds to the number of auctions participated by an advertisement of Adgroup Ad1 on the page views of "good" users (those users having "good" cookies). In the cookie correction algorithm, a unique cookie id is set to an online request (e.g., a request by a user to go to a particular Internet web page that will host advertisements, or a request by a user to conduct a particular image search or keyword search on the Internet) if the request comes in without a cookie, and those cookies are treated as "not good" cookies.

Figure 5:
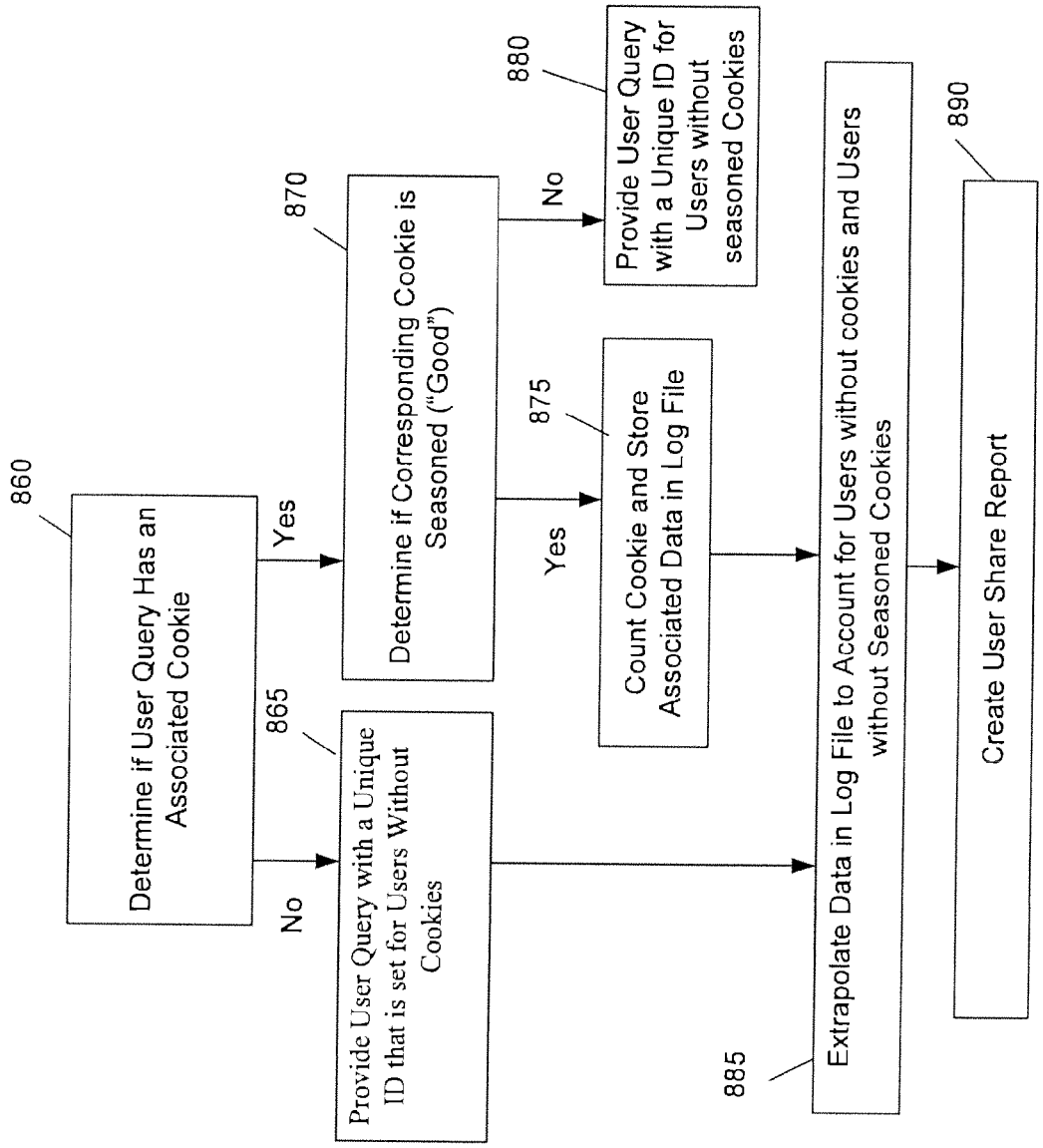
FIG. 5 is a flow diagram showing steps involved in performing cookie correction to account for users not having associated cookies, which can be utilized in accordance with various embodiments of the invention.

FIG. 5 is a flow chart showing the steps of cookie correction utilized in the formation of a user share report, according to several embodiments of the invention. In step 860, it is determined whether a user query has an associated cookie. If the request does not have an associated cookie, then in step 865 that user query is provided with a unique cookie ID that is set for users without cookies. In step 870, it is determined if the corresponding cookie is "seasoned" (e.g., is "good"). If the cookie is seasoned, then it is counted in step 875 (and its associated data is stored in the tmp-AdQueryState log file as described above). If the cookie is not seasoned, then in step 880 that user query is provided with a unique cookie ID that is set for users without seasoned cookies. In step 885, all of the user requests made within a predetermined time period (e.g., the last 24 hours) are extrapolated upwards to account for users without cookies. In step 890, a user share report is created based on the information stored in the tmp-AdQueryState, after being extrapolated in step 885.

By way of example, consider a case where there are 200 requests counted with respect to accesses to a particular web page within a certain time period, of which only 150 of those requests are made with good cookies. As such, statistics are obtained of the number of unique users in each of the five sets of users based on the 150 good cookies, and then those statistics are scaled up by a ratio of 200/150 to account for the requests made with "not good" cookies. That way, the User Share Report gives a reasonable estimation of the number of users in each category an advertisement can reach if the budget and/or bid is high enough. In this example, if 9 unique users are counted in the Bid_Lost user set, then that value is expanded to 9*(200/150)=12 unique users and that value is included in the User Share Report, since the probability is that there were 3 users in the 50 users having "not good" cookies that also were not shown the advertisements because of insufficient bid.

Since the cookie correction algorithm may be performed at the aggregate level, to obtain statistics of each of the five sets of users that are provided in the User Share Report, the individual identity of each of the unique users is preserved and not provided to an advertiser in the User Share Report.

According to several embodiments, for determining the number of users in the bid lost and budget lost user categories, as long as an advertisement is capable of being shown to a user, but was not shown because of insufficient bid, budget, quality reasons, or frequency capped reasons, it is counted in those categories of users in the User Share Report. That is, as long as the advertisement is passed from ad index to ad server, and considered as a candidate advertisement for inclusion in an auction, it is considered in the User Share Report statistics.

Figure 6:
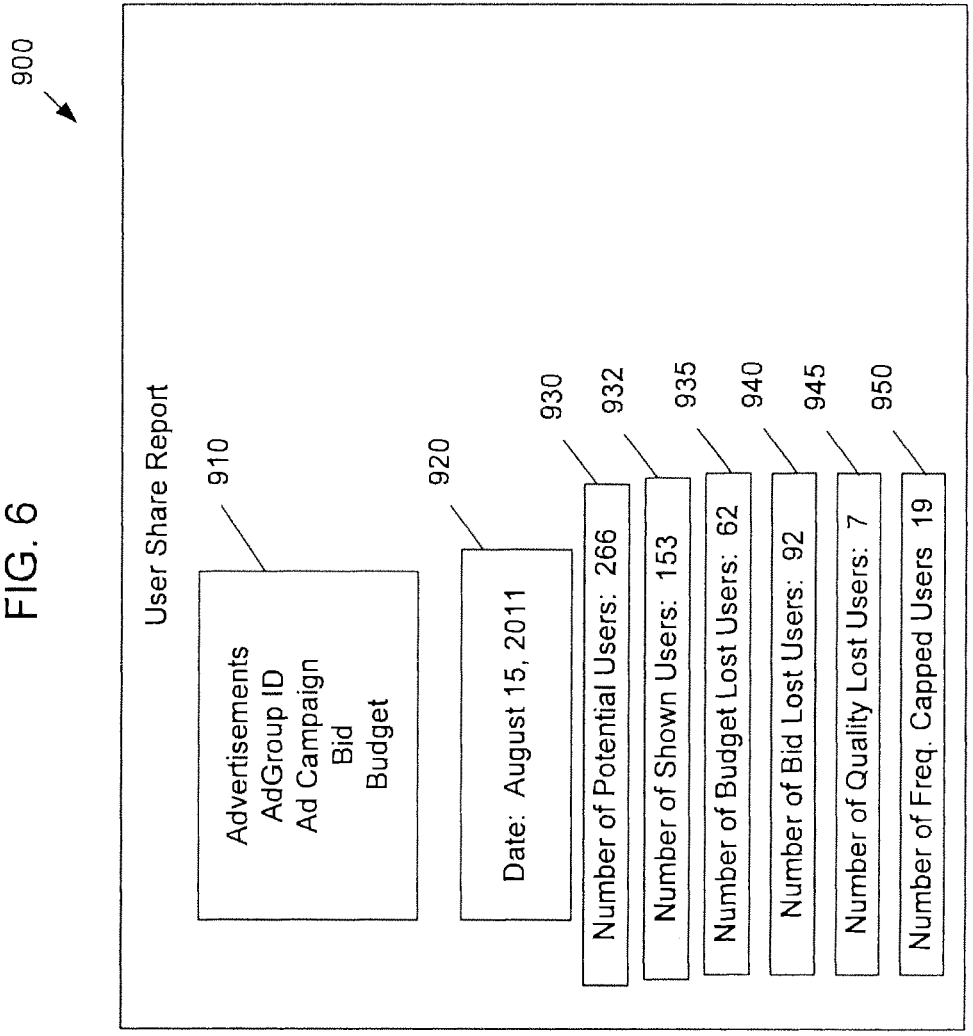
FIG. 6 is a diagram showing one possible implementation of a User Share Report, consistent with various embodiments of the invention.

FIG. 6 shows a User Share Report structure consistent with various embodiments of the invention. The User Share Report 900 includes an advertisement information area 910 that includes the advertisement(s), adgroup ID, ad campaign ID, bid associated with the ad group/ad campaign, and budget associated with the ad group/ad campaign. The User Share Report 900 includes a Date Area 920 that indicates for which date the report was generated. The User Share Report 900 also includes a Potential Users field 930, a Shown Users field 932, a Budget Lost Users field 935, a Bid Lost Users field 940, a Quality Lost Users field 945, and a Frequency Capped Users field 950. In this case, the advertisement reached 266 unique users over a one day period, and was shown to 153 unique users, but in which 62 unique users were not shown the advertisement due to low (or insufficient) budget, 92 unique users were not shown the advertisement due to low (or insufficient) bid, 7 unique users were not shown the advertisement due to quality reasons, and 19 unique users were shown the advertisement a limited number of times due to frequency capping reasons. From this information, an advertiser can determine whether it makes sense for him/her to increase the bid and/or budget for an ad group and/or ad campaign to try to reach those other users who were not shown the advertisement.

Figure 7:
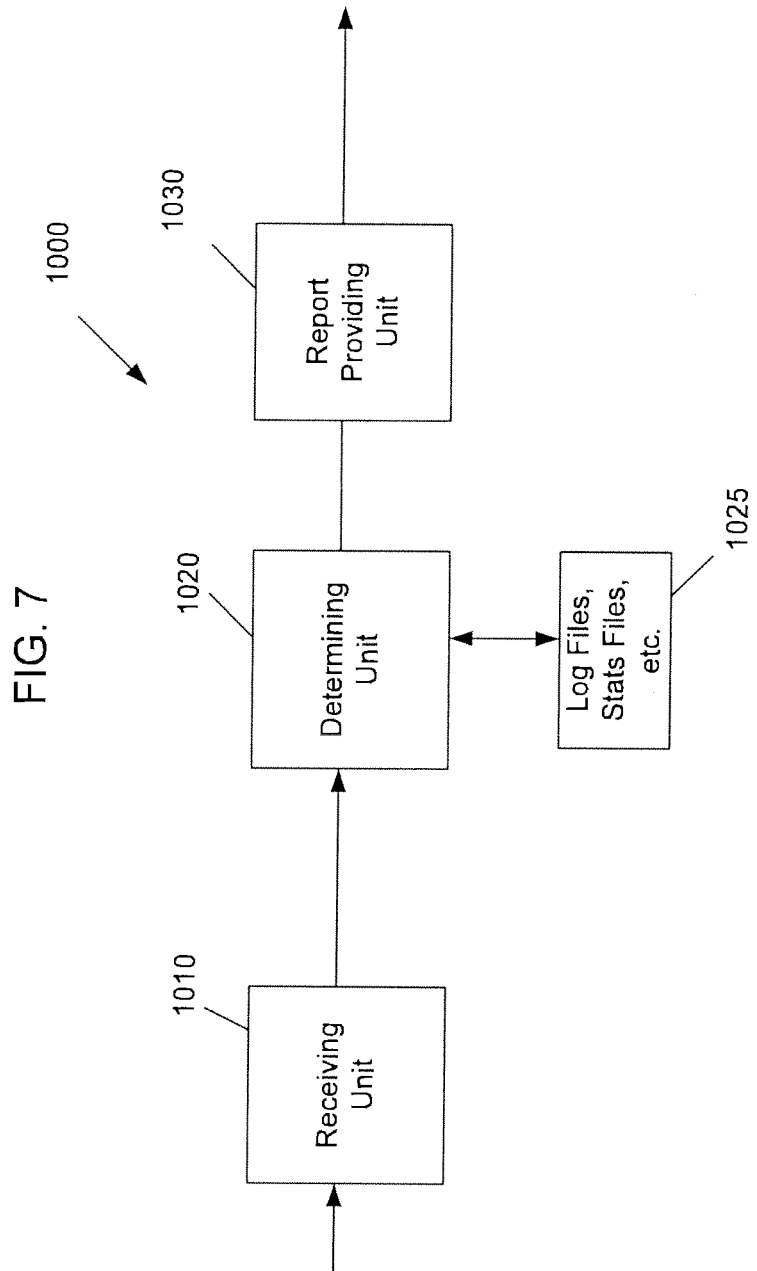
FIG. 7 is a block diagram showing elements of a content ads user share system, consistent with various embodiments of the invention.

FIG. 7 is a block diagram showing elements of a content ads user share system 1000, consistent with various embodiments of the invention. A receiving unit 1010 receives, from an advertiser, at least one keyword and/or a particular web page for which an advertisement is to be provided to a user when the user inputs the least one keyword in an Internet search and/or accesses the particular web page, the receiving unit further configured to receive, from the advertiser, one or more of a budget and a bid relating to display of the advertisement to the user when the user inputs the at least one keyword set by the advertiser in an Internet search or accesses the particular web page. A determining unit 1020 determines a first set of users who have been shown the advertisement at least once during a particular period of time, and to determine a second set of users who were not shown the advertisement at least once during the particular period of time, but who could have been shown the advertisement by the advertiser having set a higher budget and/or higher bid. To make such determinations, the determining unit 1020 accesses various log files, stats files, etc. 1025, as described in detail earlier. A report providing unit 1030 provides information regarding the first and second sets of users in the form of a User Share report.

The apparatus and method according to the first embodiment can be realized by instructions that upon execution cause one or more processing devices to carry out the processes and functions described above. Such instructions can comprise, for example, interpreted instructions, such as script instructions, e.g., JavaScript® or ECMAScript® instructions, or executable code, or other instructions stored in a computer readable medium. The apparatus and method according to the first embodiment can be distributively implemented over a network, such as a server farm, or can be implemented in a single computer device.

Figure 8:
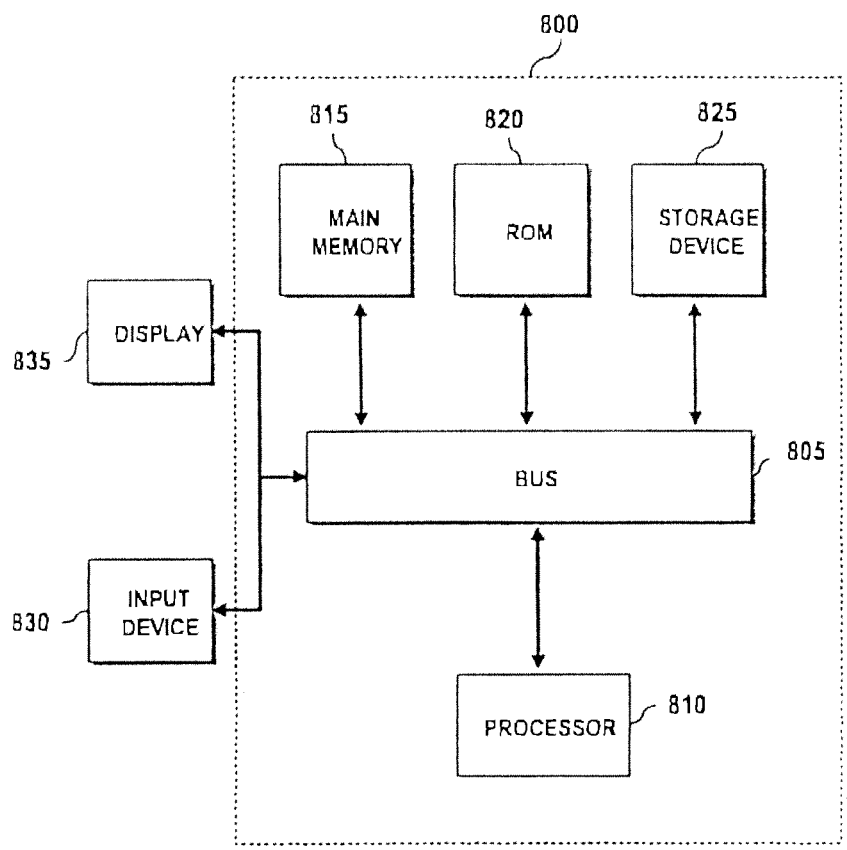
FIG. 8 is a block diagram of a computer system in accordance with an illustrative embodiment.

FIG. 8 illustrates a depiction of a computer system 800 that can be used to provide user interaction reports, process log files, implement an illustrative report generating apparatus, or implement an illustrative report generating method. The computing system 800 includes a bus 805 or other communication mechanism for communicating information and a processor 810 coupled to the bus 805 for processing information. The computing system 800 also includes main memory 815, such as a random access memory (RAM) or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory (ROM) 810 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information, and command selections to the processor 810. In another embodiment, the input device 830 has a touch screen display 835. The input device 830 can include a cursor control, such as a mouse, a trackball, or cursor direction keys, for communicating direction information and command selections to the processor 810 and for controlling cursor movement on the display 835.

According to various embodiments, the processes that effectuate illustrative embodiments that are described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative embodiments, hard-wired circuitry may be used in place of or in combination with software instructions to implement illustrative embodiments. Thus, embodiments are not limited to any specific combination of hardware circuitry and software.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a computer system, from an advertiser, a keyword, a web page, and advertisement criteria to be used in advertisement auctions considering one or more advertisements for display to users performing online actions, the advertisement criteria comprising a bid and a plurality of performance metrics selected from the group of: (a) a budget associated with an ad group, (b) a quality criterion associated with at least one of the users, or (c) a frequency cap associated with the users;
   determining, with a computer processor of the computer system, a first number of unique users for whom the one or more advertisements were candidates to be displayed based on the advertisement criteria, but to whom the one or more advertisements were not displayed, determining the first number of unique users comprising:
assigning a unique user id for each user performing online actions;
executing a cookie correction algorithm, wherein the cookie correction algorithm identifies non-unique users from unique users from the total number of users performing online actions;
collecting, for a predetermined period of time, auction data from a plurality of cookies associated with the users, wherein the auction data is associated with the received advertisement criteria;
determining, for the predetermined period of time an impression lost value for each user indicating whether the advertiser lost an advertisement auction, associated with the auction data, due to the advertisement criteria;
storing the auction data in a plurality of log files, each log file associated with a single user id and further comprising ad group id, criteria id, and the determined impression lost value associated with the user;
for the predetermined period of time, aggregating the plurality of log files using a two-stage process, wherein:
the first stage comprises transforming the plurality of log files into a plurality of tuples using a combination of the ad group id, criteria id, and user id of each log file as a primary key, each tuple comprising the impression lost value; and
the second stage comprises transforming the plurality of tuples to determine the first number of unique users for whom the one or more advertisements were candidates but to whom the one or more advertisements were not displayed, the first number of unique users identified using tuples having an impression lost value during the predetermined period of time;
for the predetermined period of time, determining the first number of unique users based on the aggregation, wherein the determining further comprises identifying a set of tuples of the plurality of tuples having an impression lost value indicating that the user associated with the tuple was not shown the one or more advertisements based on the advertisement criteria; and
creating, with the computer processor, a report for the predetermined period of time displaying information relating to the first number of unique users, wherein creating the report comprises:
determining and generating data reflecting a number of potential users, the number of potential users representing a sum of users that were shown the one or more advertisements and those that were not shown the one or more advertisements; and
determining and displaying, for each of the plurality of performance metrics, the first number of unique users to whom the one or more advertisements were not displayed based on the performance metric.

2. The method according to claim 1:
wherein each log file further comprises an impression value indicating whether the advertisement identified by the ad group id was served;
wherein each tuple further comprises the impression value;

wherein the second stage further comprises determining a second number of users identified by tuples having an impression value during the predetermined period of time; and
wherein providing information further comprises providing information relating to the second number of users.

3. The method according to claim 1:
wherein each log file further comprises a potential impression value indicating whether a user associated with the user id caused an ad server to request the advertisement from an ad index database that stores candidate advertisements;
wherein each tuple further comprises the potential impression value;
wherein the second stage further comprises determining a third number of users identified by tuples having a potential impression value during the predetermined period of time; and
wherein providing information further comprises providing information relating to the third number of users.

4. The method according to claim 1, wherein the quality criterion comprises predicted Click Thru Rate.

5. The method according to claim 1, wherein the quality criterion comprises relevancy.

6. The method according to claim 1, wherein storing the auction data is performed as a batch process once a day.

7. The method according to claim 1, wherein the user id is a pseudonymous ID of a mobile device.

8. A computer-implemented system comprising:
a receiving unit configured to:
receive, from an advertiser, a keyword, a web page, and advertisement criteria to be used in advertisement auctions considering advertisements for display to users performing online actions, the advertisement criteria comprising a bid and a plurality of performance metrics selected from the group of: (a) a budget associated with an ad group, (b) a quality criterion associated with at least one of the users, or (c) a frequency cap associated with the users;
a determining unit configured to:
determine a first number of unique users for whom the one or more advertisements were candidate to be displayed based on the advertisement criteria, but to whom the one or more advertisements were not displayed, by:
assigning a unique user id for each user performing online actions; and
executing a cookie correction algorithm, wherein the cookie correction algorithm identifies non-unique users from unique users from the total number of users performing online actions;
a database unit configured to:
collect, for a predetermined period of time, auction data from a plurality of cookies associated with the users, wherein the auction data is associated with the received advertisement criteria; and
store the auction data in a plurality of log files, each log file associated with a single user id and further comprising ad group id, criteria id, and the impression lost value associated with the user;
an aggregating unit configured to:
aggregate, for the predetermined period of time, the plurality of log files using a two-stage process, wherein:
the first stage comprises transforming the plurality of log files into a plurality of tuples using a combination of the ad group id, criteria id, and user id of each log file as a primary key to transform the plurality of log files into a plurality of tuples, each tuple comprising the impression lost value; and the second stage comprises transforming the plurality of tuples to determine a first number of unique users identified by tuples having an impression lost value during the predetermined period of time; and a report generating unit configured to:

determine, for the predetermined period of time, the first number of unique users based on the aggregation by identifying a set of tuples of the plurality of tuples having an impression lost value indicating that the user associated with the tuple was not shown the one or more advertisements based on the advertisement criteria; and generate a report for the predetermined period of time displaying information relating to the first number of unique users by:

determining and generating data reflecting a number of potential users, the number of potential users representing a sum of users that were shown the one or more advertisements and those that were not shown the one or more advertisements; and determining and displaying, for each of the plurality of performance metrics, the first number of unique users to whom the one or more advertisements were not displayed based on the performance metric.

9. The system according to claim 8:

wherein, in the database unit, each log file further comprises an impression value indicating whether the advertisement identified by the ad group id was served;

wherein, in the aggregating unit, each tuple further comprises the impression value;

wherein, in the aggregating unit, the second stage further comprises determining a second number of users identified by tuples having an impression value during the predetermined period of time; and wherein the report generating and displaying unit further comprises providing information relating to the second number of users.

10. The system according to claim 8:

wherein, in the database unit, each log file further comprises a potential impression value indicating whether a user associated with the user id caused an ad server to request the advertisement from an ad index database that stores candidate advertisements;

wherein, in the aggregating unit, each tuple further comprises the potential impression value;

wherein, in the aggregating unit, the second stage further comprises determining a third number of users identified by tuples having a potential impression value during the predetermined period of time; and wherein the report generating and displaying unit further comprises providing information relating to the third number of users.

11. The system according to claim 8, wherein the quality criterion comprises predicted Click Thru Rate.

12. The system according to claim 8, wherein the quality criterion comprises relevancy.

13. The system according to claim 8, wherein, in the database unit, storing the auction data is performed as a batch process once a day.

14. The system according to claim 8, wherein, in the database unit, the user id is a pseudonymous ID of a mobile device.

* * * * *